Nov. 10, 1953
C. R. A. GRANT
2,658,391
PISTON AND CYLINDER TYPE FLUID PRESSURE
GAUGE CONNECTING DEVICE
Filed April 10, 1950
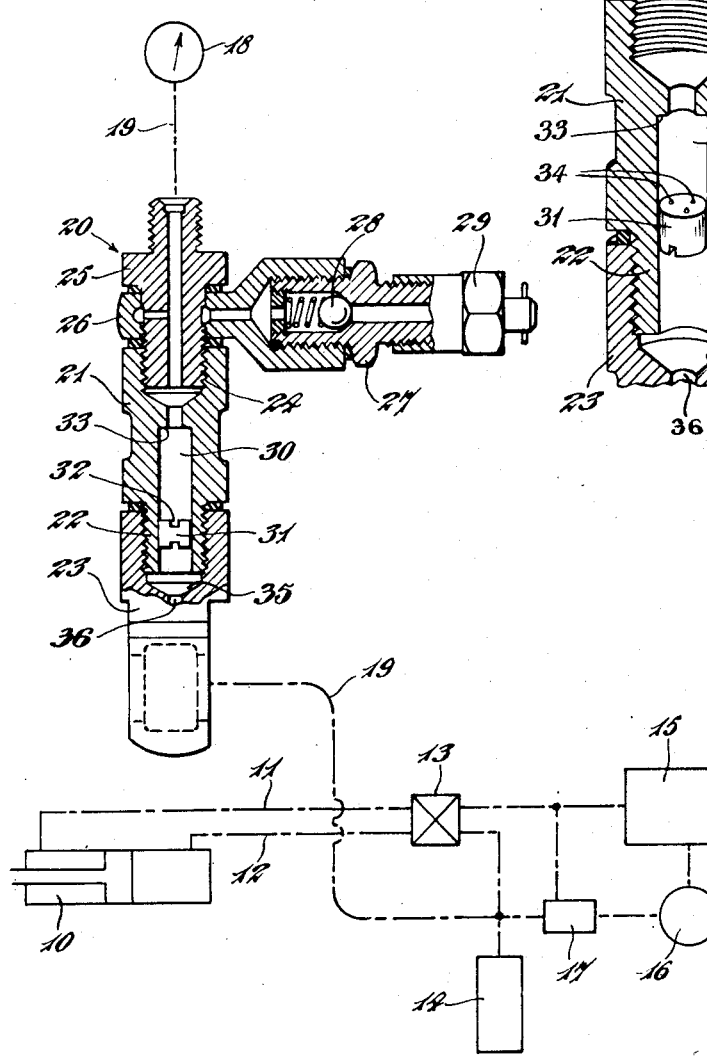
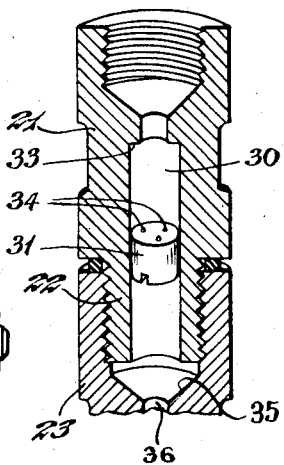
Fig. 1.
Fig. 2.
Inventor
Charles Robert Archibald Grant
by
Stevens, Davis, Miller & Mosher
his attorneys Patented Nov. 10, 1953

2,658,391

UNITED STATES PATENT OFFICE 2,658,391

PISTON AND CYLINDER TYPE FLUID PRESSURE GAUGE CONNECTING DEVICE

Charles R. A. Grant, London, England, assignor of one-half to Pressure Gauges Limited, Dublin, Eire Application April 10, 1950, Serial No. 154,916

2 Claims. (Cl. 73—389)

This invention relates to liquid pressure systems, such as, for example, liquid pressure control systems which are used on aircraft for operating under-carriages, flaps and other units, the invention being, however, applicable to all systems containing liquid under pressure.

In such systems it is usually necessary or desirable to provide at least one pressure gauge so that the liquid pressure in the system can be observed, and such gauges, being often relatively delicate instruments and more vulnerable than the remainder of the system, may prove to be a source of danger in that leakage of liquid therefrom can render the system inoperative.

The object of the present invention is to provide a gauge connection for a liquid pressure system which prevents any substantial loss of liquid from the system due to failure of a pressure gauge.

According to the present invention a pressure gauge is connected to a liquid pressure system through a conduit in which is arranged a cylinder; the cylinder having therein a piston separating the parts of the conduit leading to the system and to the gauge respectively, both parts of the system being filled with liquid.

The invention is hereinafter described with reference to the accompanying drawing, Figure 1 of which shows, diagrammatically, a liquid pressure control system, and, in section, one form of gauge connection according to the present invention, whilst Figure 2 is a cross section, in perspective, of the cylinder and piston of a modified form of gauge connection.

Referring to the Figure 1 of the drawings, the liquid pressure control system includes a ram-and-cylinder unit 10 connected by pipes 11 and 12 to a selector valve 13 by which either of the pipes 11 or 12 can be connected to a liquid pressure accumulator 14 at the same time as the other pipe is connected to a liquid reservoir 15, the accumulator 14 being maintained full of liquid under pressure by a pump 16 drawing liquid from the reservoir 15 and delivering it to a cut-out valve 17 which acts automatically to direct the liquid to the accumulator so long as the pressure in the latter is below a predetermined limit, and to return the liquid to the reservoir when that limit has been reached.

The gauge, which is indicated diagrammatically at 18, is connected to the accumulator by a pipe 19 in which is interposed the gauge connection indicated by the reference numeral 20. The connection includes a body 21 having a screw threaded spigot 22 at one end which screws into the side connection of a banjo adaptor 23 to which the pipe 19 is connected, and a screw-threaded socket 24 at the other end to receive a straight adaptor 25 which serves to clamp in position the head of a second banjo adaptor 26 into the side connection of which is screwed a plug 27 in which is mounted a non-return valve 28, the outer end of the plug carrying a fitting 29 to receive an oil gun by means of which oil can be forced into the connection. The gauge 18 is connected to the free end of the adaptor 25.

The bore 30 of the body 21 forms a cylinder for a floating piston 31 which has a diameter such as to provide an annular clearance of at most fifteen ten-thousandths of an inch in the said bore, but is not provided with piston rings or other packings. The piston is formed with a flat end which, when the piston is at the end of the bore 30 nearest to the gauge, bears on a shoulder 33 in the bore, the said end of the piston being formed with a diametral slot 32. The stroke of the piston is at least sufficient to give a liquid displacement equal to that necessary to move the gauge through its full range, its movement away from the shoulder 33 being limited by a stop constituted by a frusto-conical shoulder 35 in the adaptor 23. The shoulder 35 surrounds a port 36 connecting the cylinder 30 to the portion of the fluid conduit 19 leading to the body of the connector.

In normal operation the pressure in the system is transmitted through the piston 31 to the liquid between the piston and the gauge, and so to the gauge itself, and the gauge indicates the pressure in the system. Should the gauge burst, or develop a leak, the piston will move to the end of the cylinder 30, and, it has been found that whilst there may be an appreciable leakage of liquid past it initially this substantially ceases after a short time, and only a very small quantity of liquid is lost from the system proper. There may be further small but appreciable leakage, when, due to the operation of the ram-and-cylinder device, the pressure conditions in the system vary, but there will be no substantial continuous leakage when the system is static, and thus no loss of liquid sufficient to incapacitate the system.

When the gauge is repaired or replaced, it is found that the liquid will gradually leak past the piston to fill up the space between the piston and the gauge, the latter becoming operative without any additional liquid being injected past the valve 28.

The absence of substantial leakage past the piston is believed to be due to the progressive building up of static layers of liquid on the surfaces of the cylinder and piston, these layers being disturbed by any change in the pressure conditions on either side of the piston with the result that greater leakage takes place until they are re-formed.

It will be understood that the invention is not limited to the precise arrangement above described, the form of the connector being variable to meet the requirements of different applications of the invention.

Thus, Figure 2 shows a modified arrangement in which the piston 31 has a somewhat larger clearance in the cylinder 30, so that, whilst the piston does not readily allow liquid to flow past it, the effect above described does not take place between the cylindrical surfaces of the piston and cylinder. The end of the piston 31 which engages the shoulder 33 is not slotted, but is formed with a plurality of very small projections 34 which prevent the said end from making a fluid-tight contact with the shoulder 33 leaving a clearance such that the self-sealing effect above described takes place between the end of the piston 31 and the shoulder 33.

What I claim is:

1. In a gauge system of the type involving a fluid conduit between a gauge and a body subject to fluctuations to be measured, the improvement that comprises a cylinder interrupting the said fluid conduit, one end of said cylinder having one port connected to the portion of the fluid conduit leading to the gauge and the other end having another port connected to the portion of the fluid conduit leading to the body, a piston in said cylinder free to reciprocate therein from a position contiguous to said one port to a position contiguous to said other port, a seat in said cylinder for said piston surrounding said one port, a stop in said cylinder for said piston contiguous to said other port, means on said piston for preventing fluid-tight engagement with said seat, said piston fitting said cylinder with clearance such that the fluid leaks past the piston only when said piston engages either said seat or said stop and is thereby restrained against movement with the liquid.

2. In a gauge system of the type involving a fluid conduit between a gauge and a body subject to fluctuations to be measured, the improvement that comprises a cylinder interrupting the said fluid conduit, one end of said cylinder having one port connected to the portion of the fluid conduit leading to the gauge, a seat for said piston surrounding said port, another port at the other end of the cylinder connected to the portion of the fluid conduit leading to the body, a piston, one end face of which engages said seat when the piston is in a position contiguous to said one port, and means on said piston end face to prevent fluid-tight engagement of said end face with said seat, said piston fitting said cylinder with clearance such that the fluid leaks past the piston towards the gauge only when said piston engages said seat.

CHARLES R. A. GRANT.

References Cited in the file of this patent

UNITED STATES PATENTS

| Number | Name | Date |
|---|---|---|
| 1,828,093 | Ailman | Oct. 20, 1931 |

FOREIGN PATENTS

| Number | Country | Date |
|---|---|---|
| 629,761 | France | Nov. 17, 1927 |
| 340,700 | Great Britain | Jan. 8, 1931 |
| 778,320 | France | Mar. 14, 1935 |